Nov. 14, 1967    R. F. BOSHOLD    3,352,141
EXTRUSION PRESS CONTAINER APPARATUS
Filed May 10, 1965    2 Sheets-Sheet 1
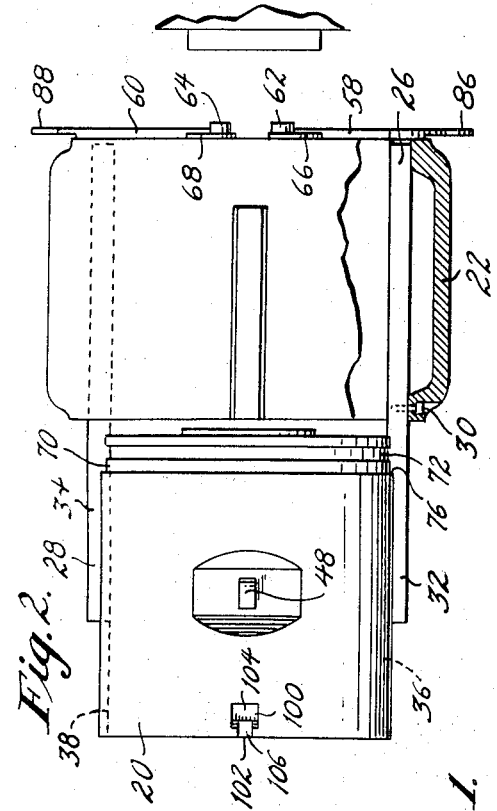
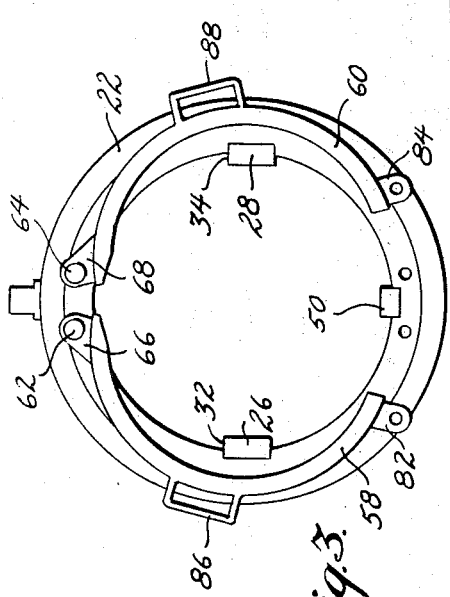
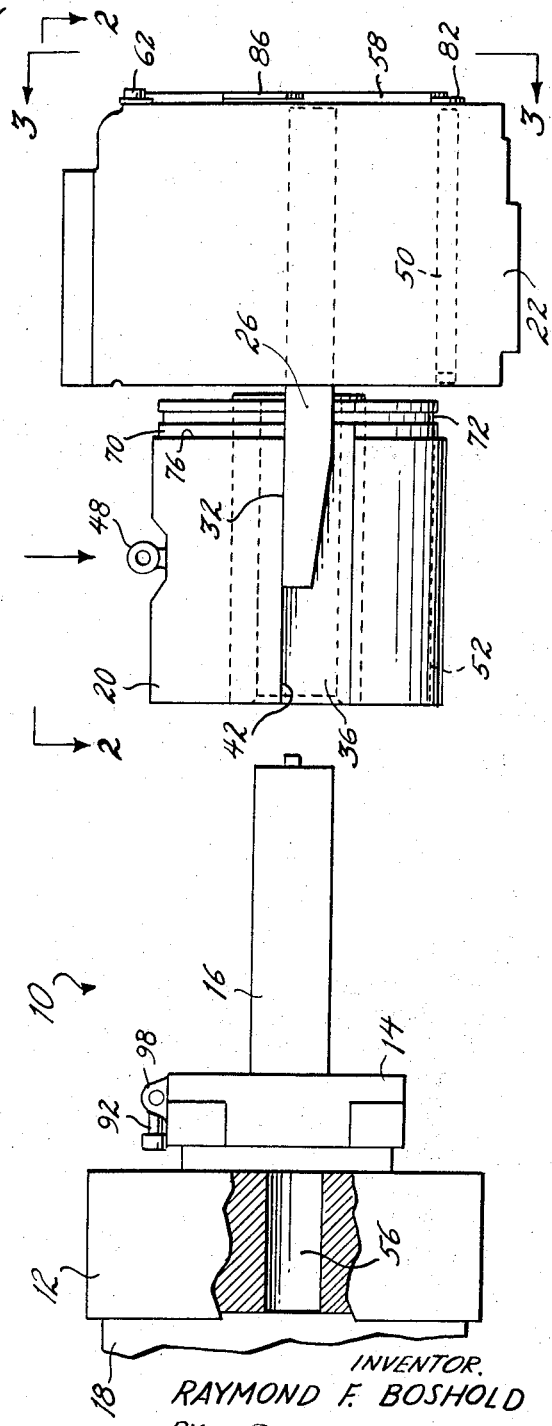
INVENTOR.
RAYMOND F. BOSHOLD
BY Seidel & Gonda
ATTORNEYS Nov. 14, 1967  R. F. BOSHOLD  3,352,141

EXTRUSION PRESS CONTAINER APPARATUS

Filed May 10, 1965  2 Sheets-Sheet 2

INVENTOR.
RAYMOND F. BOSHOLD
BY Seidel & Gonda
ATTORNEYS.

United States Patent Office 3,352,141
Patented Nov. 14, 1967

3,352,141
EXTRUSION PRESS CONTAINER APPARATUS
Raymond F. Boshold, Springfield, Pa., assignor to Baldwin-Lima-Hamilton Corp., Philadelphia, Pa., a corporation of Pennsylvania
Filed May 10, 1965, Ser. No. 454,535
8 Claims. (Cl. 72—272)

ABSTRACT OF THE DISCLOSURE

An extrusion press container holder is provided with keys for supporting the container so that the container may reciprocate in an axial direction onto support surfaces whereby the container may be lifted vertically.

---

This invention relates to an extrusion press container apparatus. More particularly, this invention relates to a container apparatus constructed to improve the efficiency of inserting and removing a container from the container holder and a novel apparatus for locking the container in its holder.

For the most efficient utilization of extrusion machinery, it is desirable that inoperative periods or down time be reduced to a minimum. Thus, it is desirable that means be provided for quickly changing extrusion press containers. The present invention therefore is directed to apparatus for reducing container change time further than has been heretofore possible.

It therefore is a general object of the present invention to provide a novel apparatus for reducing extrusion press container change time.

It is yet another object of the present invention to provide a novel extrusion press container apparatus.

It is still another object of this invention to provide a novel means for locking a container within its container holder.

It is still a further object of the present invention to provide a novel apparatus for aligning and guiding an extrusion press container into its container holder.

It is yet another object of the present invention to provide a novel apparatus for removing an extrusion press container from its container.

It is another object of the present invention to provide a novel apparatus for aligning and guiding an extrusion press container into its container holder; for locking an extrusion container press into its container holder; and for removing an extrusion press container from its container holder.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a side view of an extrusion press illustrating a container in position outside the container holder and partially illlustrating the moving crosshead and stem.

FIGURE 2 is a top plan view of the container and container holder, broken away from FIGURE 1, taken along the line 2—2.

FIGURE 3 is a rear view of the extrusion press shown in FIGURE 1 taken along the line 3—3.

Referring now to the drawings in detail, wherein like numerals indicate like elements, there is shown in FIGURE 1 a partial side view of an extrusion press apparatus designated generally as 10.

Figure 4:
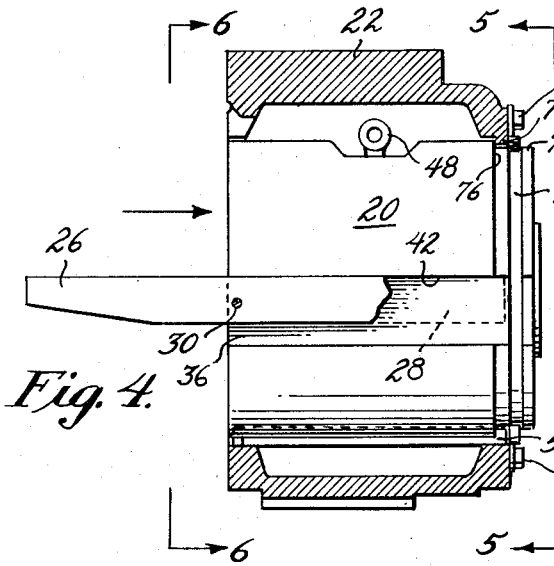
FIGURE 4 is a side view of the extrusion press container apparatus illustrating the container inside the container holder.

As shown, the extrusion press includes a moving crosshead 12, stem mounting structure 14 and a stem 16. The moving crosshead 12 is associated with the main ram 18 which is only partially shown. The moving crosshead 12, stem mounting structure 14, stem 16 and main ram 18 are conventional extrusion press components and therefore need not be described in detail. As is conventional in apparatus such as press 10, the main ram 18 is associated with a main cylinder (not shown) which is adapted to reciprocate the moving crosshead 12 and stem 16 along the longitudinal axis of the press.

Figure 6:
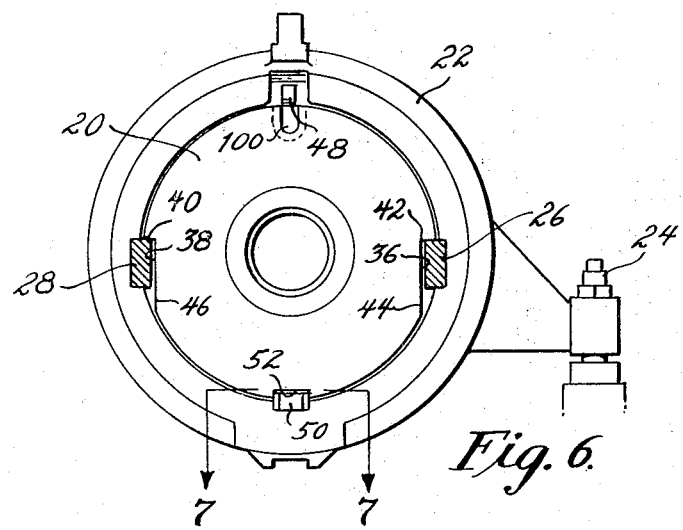
FIGURE 6 is a front view of the extrusion press container apparatus shown in FIGURE 4 taken along the line 6—6 and also illustrating one of the jack screws.
Figure 7:
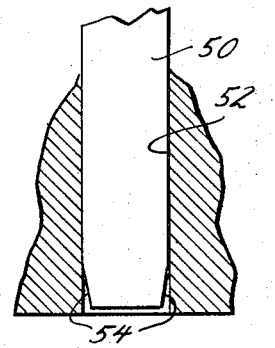
FIGURE 7 is an enlarged sectional view of the bottom key shown in FIGURE 6 taken along the line 7—7.

The extrusion press 10 is also provided with a container 20 and container holder 22. The container holder 22 is adjustably supported on the press base by means of jack screws 24, one of which is shown in FIGURE 6. A detailed operation of a jack screw need not be provided since they have previously been used with extrusion presses. In general, the function of the jack screw is to adjust the position of container holder 22 to maintain press alignment with the stem 16. The container holder 22 is a one piece container holder as compared to the two piece type with separable halves. The one piece container holder is preferable to the two piece design because it produces better press alignment due to more uniform heat expansion. Moreover, faster container change is possible because there is no upper half to be unfastened and removed so that the container can be lifted out.

Normally, the container for a one piece container holder is provided with three or four keyways which register with a corresponding number of keys in the container holder. A container is normally changed by lowering it between the press stem and the container holder by means of a crane until the container center line approximately coincides with the press and container holder center line. A curved shim is then placed atop the stem and the stem is advanced into the suspended container. Before the container can be pushed into the holder, however, it is necessary to provide exact alignment of the keys and keyways. This is accomplished by manually rotating the container on the stem and/or raising or lowering the container holder with its jack screws. This process is time-consuming and further lengthens the change time since adjustment of the jack screws upsets press alignment which must be re-established before press operation can be commenced. The present invention substantially lowers change time by eliminating most of the complicated steps described above.

Referring to the drawings, the one piece container holder 22 is provided with a pair of horizontally spaced apart keys 26 and 28. Keys 26 and 28 are mounted on the inner peripheral wall of the container holder 22 by means of bolts 30 which extend through the holder 22 and threadedly engage the keys. As best shown in FIGURES 1 and 3, the keys 26 and 28 are preferably laterally spaced apart across the horizontal diameter of container holder 22. Although this disposition is preferred, it will be apparent that keys 26 and 28 may be disposed at other positions within the container holder 22, so long as they are on opposite sides of the vertical diameter and laterally spaced apart. The position shown is preferred since it requires the least amount of material to be removed from the outer wall of container 20.

The keys 26 and 28 perform two functions. The first is that of supporting the container 20 within the holder 22 as has been described above. The second function of the keys 26 and 28 is to act as alignment guides for directing the container 20 into the container holder. In this respect, the keys 26 and 28 are mounted to the container holder 22 so that the upper surfaces thereof 32 and 34 are parallel to an alignment axis. In most instances, as here, the alignment axis to which surfaces 32 and 34 are parallel is the longitudinal axis of the cylindrical container holder 22. Furthermore, the alignment axis will be the axis of the press 10 and stem 16 to which the container 20 must be aligned. Since the container 20 is shown as being cylindrical, its longitudinal axis must be aligned with the axis of container 22.

The outer peripheral wall of container 20 is provided with a pair of keyways 36 and 38. As shown, the keyways 36 and 38 are positioned in the wall of container 20 to correspond with the positions of keys 26 and 28. Each keyway is provided with an upper surface 40 and 42 that is parallel to the longitudinal axis of the container. As best shown in FIGURE 6, the keyways 36 and 38 are cut through at the bottom so that they are essentially L-shaped channels having vertical walls 44 and 46 together with the horizontal alignment surfaces 40 and 42. By providing L-shaped keyways which are open in the horizontal and vertical directions, the keyways 36 and 38 may receive the keys 26 and 28 when the container 20 is lowered onto the portion of the keys that is extended outwardly through the front opening of container holder 22.

As shown in FIGURE 1, the container 20 can be suspended by the eyelet 48 and lowered onto the extended portions of keys 26 and 28. Since the keyways 36 and 38 are open at the bottom, the vertical walls 44 and 46 easily fit between them and the container center line is aligned with the container holder center line as soon as the surfaces 40 and 42 come to rest on the key surfaces 34 and 32. From the foregoing, it will be apparent that the alignment process described above has been completely eliminated since it is no longer necessary to adjust the position of the container holder 22 and the container 20 while holding the container suspended in front of the holder.

As shown, the container holder 22 is provided with a third key 50 mounted in the bottom thereof. The key 50 does not extend beyond the front of the container holder 22 as do keys 26 and 28. The container 20 is provided with a mating keyway 52 for receiving the key 50. The front portion of the sides of the key 50 are chamfered as indicated by the numeral 54. The chamfered surfaces 54 act as cam surfaces for guiding the keyway 52 onto the key 50 without damaging the edges thereof.

FIGURES 1 and 2 show the container in position after it has been lowered onto the extended portion of keys 26 and 28 and thereby automatically aligned for insertion into the container holder 22. In this position, the container is in correct alignment both vertically and angularly and requires no further adjustment. To complete the change process, the moving crosshead 12 and stem 16 are brought forward in the usual manner to push the container 20 into the holder 22, where it is locked in position by means to be described below. Since the keys 26 and 28 are permanently mounted to the container holder 22, a pair of clearance holes 56 are provided on either side of the moving crosshead 12. The clearance holes provide a means whereby the extended portions of keys 26 and 28 will not interfere with the reciprocation of moving crosshead 12.

FIGURE 4 shows the container 20 in position within the container holder 22. The container 20 is fastened within the holder 22 by a split ring assembly shown in its open disposition in FIGURE 3 and its locking disposition in FIGURE 5. As shown, the split ring assembly consists of a pair of elongated members 58 and 60 which are circular in the embodiment shown to conform with the cylindrical peripheral wall of the container. The members 58 and 60 are pivotally mounted adjacent the rear opening of the container 22 by means of pivot pins 62 and 64 which extend through the pivot tabs 66 and 68 respectively.

The container 20 is provided with an extended cylindrical portion 70 at the rear thereof. The length of portion 70 is such that it protrudes beyond the rear opening defined by the flange 74. The flange 74 provides a stop shoulder which cooperates with an abutment shoulder 76 on the container 20 to define the correct longitudinal position of the container 20 in the holder 22. When the container 20 is properly positioned within container 22, the groove 72 formed on extended portion 20 is juxtaposed the outer face of flange 74 so as to be capable of receiving elongated members 58 and 60.

Figure 5:
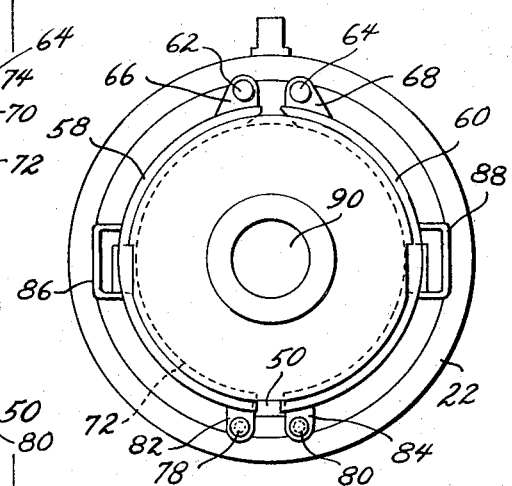
FIGURE 5 is a rear view of the extrusion press container apparatus shown in FIGURE 4 taken along the line 5—5.

The container 20 is fixed within container 22 by pivoting members 58 and 60 from the position shown in FIGURE 3 to that shown in FIGURE 5. In the position shown in FIGURE 5, the members 58 and 60 are concentric with the container 20 and the container 22 axes. In this position, they have been inserted into the groove 72 and thereby lock the container in position. The members 58 and 60 are fixedly held in the container locking position by a pair of threaded bolts or spring-loaded pins 78 and 80 which extend through holes in tabs 82 and 84 and register with corresponding holes in the container holder. The elongated members 58 and 60 are provided with handles 86 and 88 for inserting them into the groove 72 and withdrawing them therefrom. From the foregoing, it is apparent that the press 10 has been provided with a container locking mechanism that is both quick and simple to operate. Thus, it requires nothing more than the insertion of bolts or spring-loaded pins 78 and 80 after the members 58 and 60 have been pivoted into position within groove 72.

Figure 8:
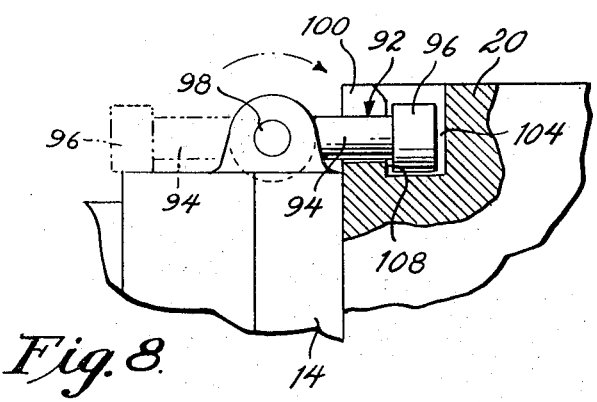
FIGURE 8 is an enlarged detail view of the latch bolt in the position of use.

To remove the container 20 from the holder 22, the stem 16 is advanced into the container cavity 90 until the stem mounting structure 14 is adjacent the front face of holder 22. FIGURE 8 illustrates the press 10 in this disposition. A latch bolt 92 comprising a shank 94 with an enlarged head 96 at one end thereof is pivotally mounted at the other end to the stem mounting structure 14. The shank 94 pivots about a pintle that is fixed in the pintle mount 98. The container 20 is provided with a recess 100 that is shaped to receive the latch bolt 92. Thus, the recess 100 is provided with a narrow front portion 102 and a widened rear portion 104. As is obvious from FIGURE 8, the rear portion 104 is adapted to receive the head 96 and the front portion to receive the shank 94. Further, the junction of portions 102 and 104 define a shoulder 108 within the recess 100.

By bringing the stem mounting structure 14 adjacent the front face of container 22 and then pivoting latch bolt 92 into recess 100, the container 20 can be withdrawn from the container holder 22 by releasing members 58 and 60 from slot 72 and reciprocating structure 14. When this is done, the latch bolt head 96 will engage shoulder 108 and pull the container 20 from container holder 22. As soon as container 20 has been pulled to its position where it is clear of container 22, the latch bolt 92 is pivoted out of recess 100, the stem is retracted fully and container 20 lifted away from keys 26 and 28.

From the foregoing, it may be seen that an apparatus for quickly changing extrusion press containers has been provided.

The present invention may be embodied in other specific forms without departing from the spirit or essential attributes thereof and, accordingly, reference should be made to the appended claims, rather than to the foregoing specification as indicating the scope of the invention.

I claim:
1. An extrusion press container apparatus comprising a container holder having a generally cylindrical opening for receiving a container, a generally cylindrical container for insertion into said container holder through said opening, and means to align said container as said container is being inserted into said container holder, said alignment means including two keys extending along the inner container holder peripheral wall and outwardly from said container holder, said keys having an upper surface parallel to the alignment axis of said container holder, said keys being laterally spaced apart, two keyways in the outer wall of said container, said keyways having an upper surface parallel to the alignment axis of said container, a recessed portion in said container wall adjacent the bottom of said keyways so that said keyways open in both a vertical and horizontal direction, whereby said container can be lowered directly onto the outwardly extending portion of said keys for contacting alignment by said alignment surfaces.

2. In an extrusion press container apparatus comprising a container holder, a container in said holder, means for aligning said container with and for supporting the container by said holder, said means including at least two keys supported by said holder, each key having an alignment surface thereon, a corresponding number of keyways in said container, each keyway contacting one of said alignment surfaces, and said keys projecting beyond an end face of the holder for supporting the container when the container is disposed entirely outside the holder.

3. An apparatus in accordance with claim 2 wherein said keyways are open in a downward direction so that the container may be raised vertically while supported by said keys exteriorly of said holder.

4. An extrusion press container apparatus in accordance with claim 2 including means to lock said container within said container holder, said lock means including an extension portion on said container protruding beyond an opening in said container holder, a groove in said extension portion juxtaposed to said opening, and a pair of pivotally mounted, elongated members on said container holder adjacent said opening selectively insertable into said groove, and means to fix said members in said groove.

5. In an extrusion press including a container holder, a container removably supported within said container holder, a moving crosshead, a stem, mounting structure for mounting said stem to said moving crosshead, said stem being selectively insertable into the container, and means for removing the container from said container holder including a recess in the outer wall of said container, a shoulder in said recess remote from the ends thereof, and a latch means mounted on said mounting structure, said latch means including engagement means, said latch means being mounted for selective engagement of said engagement means with said shoulder within said recess.

6. An extrusion press container comprising a one piece container holder open at the ends thereof, a container for insertion into said container holder through one of the open ends, means to align said container as said container is being inserted into said container holder, said alignment means including at least two transversely spaced apart keys extending from said container, said keys extending through and beyond said one end, each key having an alignment surface parallel to an alignment axis, at least two corresponding keyways in the peripheral wall of said container, each said keyway being open in a vertical direction, an alignment surface in each keyway for contacting said key alignment surfaces, and means to fasten said container within said container holder, said fastening means including an extension portion on said container protruding through the other opening in said container holder, a groove in said extension portion juxtaposed said other opening when said container is within said container holder, and a pair of pivotable elongated members mounted on said container holder adjacent said other opening for selective insertion into said groove, and means to fix said members in said groove.

7. In an extrusion press including a one piece container holder open at the ends thereof, a container removably supported within said container holder, a moving crosshead, a stem, mounting structure for supporting said stem on said moving crosshead, said stem being selectively insertable in a container cavity, means to align said container as the container is being inserted into said container holder, said alignment means including at least two transversely spaced apart keys extending from said container, said two keys extending through an opening in one end of said container holder, each key having an alignment surface parallel to an alignment axis, at least two corresponding keyways in the peripheral wall of said container, each said keyway being open in a vertical direction, an alignment surface in each keyway for contacting said key alignment surfaces, means to fasten said container within said container holder, said fastening means including an extension portion on said container protruding through the other opening in said container holder, a groove in said extension portion juxtaposed said other opening when said container is within said container holder, a pair of pivotable elongated members mounted on said container holder adjacent said other openings for selective insertion into said groove, means to fix said members in said grooves, and means for removing said container from said container holder comprising a recess in the outer wall of said container, a shoulder in said recess remote from the ends thereof, and latch means pivotally mounted to said mounting structure, said latch means including engagement means, said latch means being mounted for selective engagement of said engagement means with said shoulder within said recess.

8. An extrusion press including a one piece container holder open at the ends thereof, a container removably supported within said container holder, a moving crosshead, a stem, mounting structure for supporting said stem on said moving crosshead, said stem being selectively insertable into a container cavity, means to align said container as said container is being inserted into said container holder, said alignment means including at least two transversely spaced apart keys extending from said container, said two keys extending through one of said ends and projecting there beyond, each key having an alignment surface parallel to an alignment axis, at least two corresponding keyways in the peripheral wall of said container, each said keyway being open in a downwardly direction, an alignment surface in each keyway for contacting said key alignment surfaces, and means for removing said container from said container holder onto the portion of the keys projecting beyond said one end so that the container may be raised vertically from the key alignment surfaces.

References Cited
UNITED STATES PATENTS

| | | | |
|---|---|---|---|
| 1,037,213 | 9/1912 | Derain | 72—263 |
| 1,944,982 | 1/1934 | Hoy | 72—272 |
| 3,229,791 | 1/1966 | Soman | 292—256.75 |

FOREIGN PATENTS

| | | |
|---|---|---|
| 727,208 | 3/1955 | Great Britain. |
| 923,959 | 4/1963 | Great Britain. |

CHARLES W. LANHAM, *Primary Examiner.*

K. C. DECKER, *Assistant Examiner.*

UNITED STATES PATENT OFFICE
CERTIFICATE OF CORRECTION

Patent No. 3,352,141            November 14, 1967

Raymond F. Boshold

It is hereby certified that error appears in the above numbered patent requiring correction and that the said Letters Patent should read as corrected below.

In the heading to the printed specification, lines 3 to 5, for "assignor to Baldwin-Lima-Hamilton Corp., Philadelphia, Pa., a corporation of Pennsylvania" read -- assignor, by mesne assignments, to Balwin-Lima-Hamilton Corporation, Philadelphia, Pa., a corporation of Delaware --.

Signed and sealed this 3rd day of December 1968.

(SEAL)

Attest:

Edward M. Fletcher, Jr.            EDWARD J. BRENNER

Attesting Officer            Commissioner of Patents